United States Patent
Torgersrud et al.

(10) Patent No.: US 9,117,171 B2
(45) Date of Patent: Aug. 25, 2015

(54) DETERMINING A THREAT LEVEL FOR ONE OR MORE INDIVIDUALS

(71) Applicant: Telmate, LLC, San Francisco, CA (US)

(72) Inventors: Richard Torgersrud, San Francisco, CA (US); Christopher Ditto, San Jose, CA (US)

(73) Assignee: INTELMATE LLC, San Francisco, CA (US)

(*) Notice: Subject to any disclaimer, the term of this patent is extended or adjusted under 35 U.S.C. 154(b) by 247 days.

(21) Appl. No.: 13/831,431

(22) Filed: Mar. 14, 2013

(65) Prior Publication Data

US 2014/0279767 A1 Sep. 18, 2014

(51) Int. Cl.
 *G06F 1/00* (2006.01)
 *G06N 5/00* (2006.01)
 *G06N 5/02* (2006.01)

(52) U.S. Cl.
 CPC .................................... *G06N 5/02* (2013.01)

(58) Field of Classification Search
 CPC ........... G06N 5/02; G06N 7/005; G06N 3/02; G06N 5/025
 See application file for complete search history.

(56) References Cited

U.S. PATENT DOCUMENTS

2005/0171816 A1* 8/2005 Meinert et al. ............ 705/3
2010/0299292 A1* 11/2010 Collazo ................... 706/14
2013/0298244 A1* 11/2013 Kumar et al. ............. 726/25

* cited by examiner

*Primary Examiner* — Jeffrey A Gaffin
*Assistant Examiner* — Kalpana Bharadwaj
(74) *Attorney, Agent, or Firm* — McDermott Will & Emery LLP

(57) ABSTRACT

A system and computer-implemented method for determining a threat level for one or more individuals includes accessing a data structure to obtain aggregated data stored therein, wherein the aggregated data comprises at least one of communication history data or transaction history data for one or more individuals. One or more predetermined metrics are applied to the obtained aggregated data, to determine threat level information for the one or more individuals. The determined threat level information is provided for display.

20 Claims, 5 Drawing Sheets

DETERMINING A THREAT LEVEL FOR ONE OR MORE INDIVIDUALS

FIELD

The present disclosure generally relates to computer systems, and more particularly to the use of a computer system to determine a threat level for one or more individuals.

DESCRIPTION OF THE RELATED ART

Certain types of people can be placed in situations that require them to determine a detainee's threat to the public, threat to correctional staff, threat to other detainees or to themselves, and likelihood to commit crimes after release. Such types of people include, but are not limited to, law enforcement officials, judges who determine bail and sentencing, prosecuting attorneys who decide whether to prosecute or the details of a plea agreement and correctional officers who determine where to house detainees, and parole board members.

These people rely on a small pool of available data when determining a detainee's threat, often relying on reports of violent behaviors recorded by correctional staff while the detainee is in custody, and the nature of the crime or crimes the detainee is accused or convicted of.

SUMMARY

According to one embodiment of the present disclosure, a computer-implemented method for determining a threat level for one or more individuals is provided. The method comprises accessing a data structure to obtain aggregated data stored therein, wherein the aggregated data comprises at least one of communication history data or transaction history data for one or more individuals. The method further comprises applying one or more predetermined metrics to the obtained aggregated data, to determine threat level information for the one or more individuals, and providing the determined threat level information for display.

According to another embodiment of the present disclosure, a system for determining a threat level for one or more individuals is provided. The system comprises one or more processors, and a machine-readable medium comprising instructions stored therein, which when executed by the processors, cause the processors to perform operations comprising accessing a data structure to obtain aggregated data stored therein, wherein the aggregated data comprises at least one of communication history data or transaction history data for one or more individuals, applying one or more predetermined metrics to the obtained aggregated data, to determine threat level information for the one or more individuals, and providing the determined threat level information for display.

According to a further embodiment of the present disclosure, machine-readable medium is provided. The machine-readable medium comprises instructions stored therein, which when executed by a system, cause the system to perform operations comprising accessing a data structure to obtain aggregated data stored therein, wherein the aggregated data comprises at least one of communication history data or transaction history data for one or more individuals. The operations further comprise applying one or more predetermined metrics to the obtained aggregated data, to determine threat level information for the one or more individuals, and providing the determined threat level information for display.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
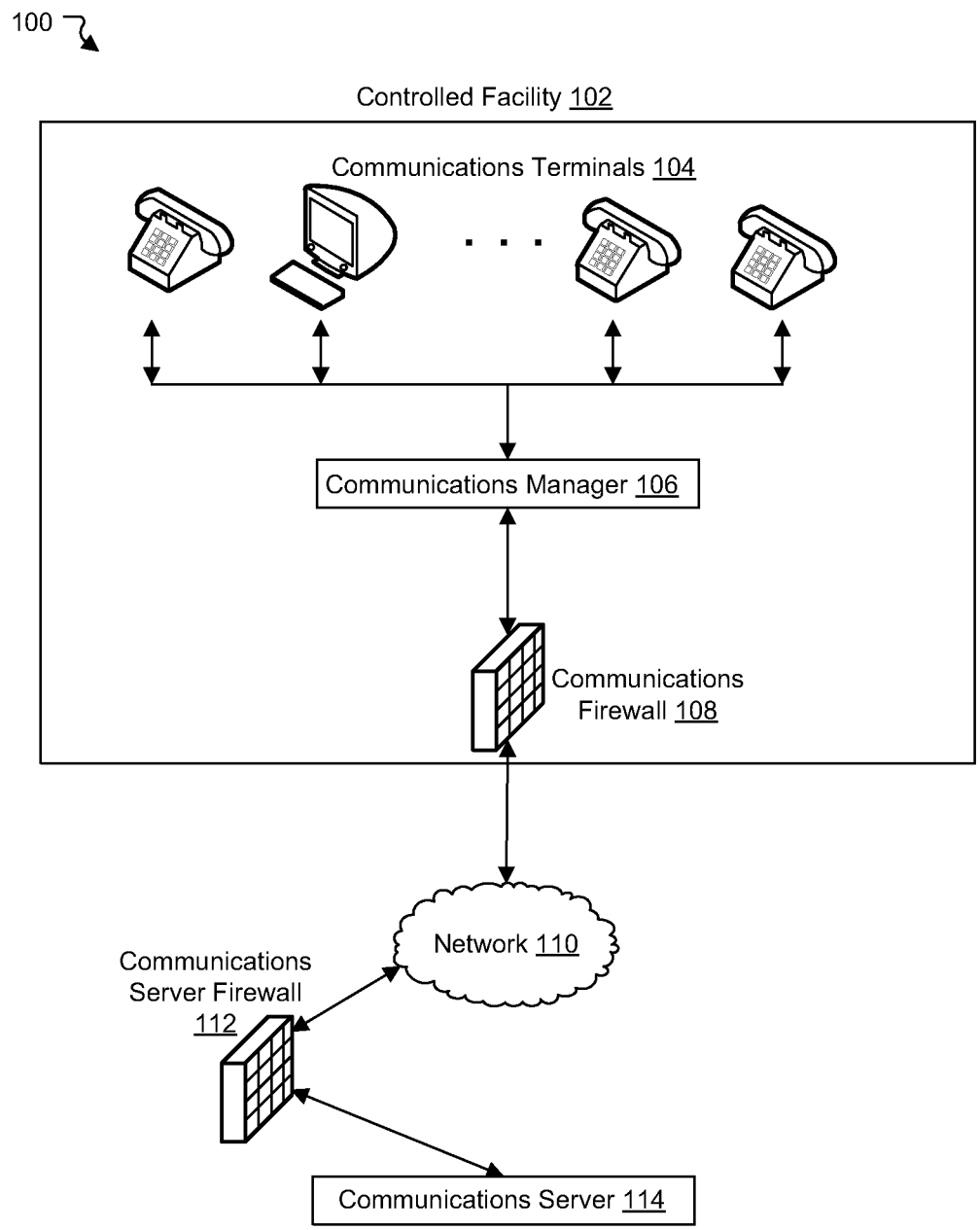
FIG. 1 illustrates an example architecture for determining a threat level for one or more individuals.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

As noted above, certain types of people (e.g., law enforcement officials, judges who determine bail and sentencing, prosecuting attorneys, and parole board members) are placed in situations that require them to determine a detainee's threat to the public, threat to correctional staff, threat to other detainees, and likelihood to commit crimes after release. These individuals rely on a small pool of available data when determining a detainee's threat, often relying on reports of violent behaviors recorded by correctional staff while the detainee is in custody, and the nature of the crime or crimes the detainee is accused or convicted of.

However, other data with statistical relevance is overlooked because it is difficult to access and difficult to interpret, and often officials simply may not realize that inferences regarding behavior and threats can be made from data that, on the surface, may appear unrelated.

The subject technology analyzes the communication and transactional history of an individual (e.g., a detainee), providing additional metrics for determining the individual's threat level. Using this information, officials can be alerted to patterns or trends that correlate with actual threatening behavior of individuals who exhibited similar communication patterns.

More particularly, the subject technology provides for determining a threat level for one or more individuals. A data structure is accessed to obtain aggregated data stored therein, wherein the aggregated data comprises at least one of communication history data or transaction history data for one or more individuals. One or more predetermined metrics are applied to the obtained aggregated data, to determine threat level information for the one or more individuals. The determined threat level information is provided for display.

As used herein, the "threat level" is an individual's likelihood of threatening activity. This activity can include, but is not limited to, harming others, harming themselves (e.g., risk of suicide or self-harm), or recidivism. In example aspects, threat level can also indicate a likelihood of depression for an individual.

While many examples are provided herein in the context of a correction facility, the principles of the present disclosure contemplate other types of controlled facilities as well. For example, businesses and governmental entities (e.g., administrative or military) are all considered within the scope of the present disclosure.

Furthermore, although many examples provided herein describe an individual's communication or transaction history information being stored in memory, permission may be granted for each individual to have such information stored. In the context of a detention environment, permission may be granted by the detainee agreeing to be present in the detention environment, or by another entity with appropriate legal authorization to grant permission to track the such information in the detention environment. Each detainee can be provided notice that such information will be stored. The stored individual information may be encrypted to protect individual security.

FIG. 1 illustrates an example architecture for determining a threat level for one or more individuals. The architecture 100 illustrates a controlled facility 102 (e.g., a detention environment) that includes communications terminals 104 connected to a network 110 through a communications firewall 108 using a communications manager 106. The architecture 100 further includes a communications server 114 as described herein connected to the network 110 through a communications server firewall 112. The firewalls 108 and 112 can be software-based or hardware-based.

Each of the communications terminals 104 is connected to a communications manager 106. In certain aspects, for purposes of load balancing, the communications terminals 104 can be connected to many communications managers. The communications terminals 104 can be audio communication terminals, video communication terminals, tactile communications terminals (e.g., for the visual and/or hearing impaired), or other terminals configured for communication between two individuals. In certain aspects, the communication terminals can be mobile, such as mobile smartphones or mobile kiosks.

Alternatively, or in addition, the communications terminals can be kiosks for depositing funds (hereinafter "deposit kiosks"). For example, deposit kiosks can be located in an inmate intake area of a detention center (e.g., controlled facility 102), for a newly-booked detainee/inmate to post bail, or for a family member or friend to post bail or otherwise deposit funds for a detainee.

The communications manager 106 to which the communications terminals 104 are connected can be, for example, a networking device such as a router, gateway, or switch. The communications manager 106 can be configured for various protocols of communication including, for example, Internet Protocol (IP), voice over IP (VoIP), audio and video Internet telephony network protocols, or telephone switching.

The communications manager 106 is connected to the network 110, such as the Internet, a metropolitan area network (MAN), a wide area network (WAN), a broadband network (BBN), and the like. Further, the network 110 can include, but is not limited to, any one or more of the following network topologies, including a bus network, a star network, a ring network, a mesh network, a star-bus network, tree or hierarchical network, and the like. In certain aspects where the communications server 114 is located at the controlled facility 102, the network 110 can include, for example, any one or more of a personal area network (PAN), a local area network (LAN), or a campus area network (CAN). The connection between the communications manager 106 and the network 110 can be protected using a communications firewall 108, which can be particularly relevant to protecting the security of the controlled facility 102 by limiting access to devices in the controlled facility 102 to authorized individuals or processes.

The communications server 114 is connected to the network 110 through the communications server firewall 112. In example aspects, the communications server 114 is responsible for storing communication data and/or transaction from the communications terminals 104 for individuals in the controlled facility 102, and for creating aggregated communication history data and/or transaction history data. The communications server 114 can be any device having an appropriate processor, memory, and communications capability for hosting the terminal-based resident location information.

In certain aspects, the communications server 114 can receive a request for a threat level of one or more individuals. The threat level can be requested automatically (e.g., periodic requests) or manually for an individual (e.g., detainee). In response to the received request, communications server 114 accesses aggregated data (e.g., from a data structure) comprising at least one of communication history data or transaction history data for the one or more individuals. Communications server 114 applies one or more predetermined metrics (e.g., algorithms) to the obtained aggregated data, to determine threat level information for the one or more individuals. Communications server 114 provides the determined threat level information for display. Thus, with reference to correctional facility 102, communications server 114 can analyze detainee communication statistical data to estimate the threat that the detainee poses to other detainees, facility staff, and the public.

As described in greater detail below with reference to FIG. 2, application of the predetermined metrics may correspond to analyzing one or more of the following over a given time period: call volume data, voicemail data, deposit data, visitation data, exchange of messages, photos and video and arrest data. Based on this data, and other available communication data, the subject technology can create a threat estimate, for example, in the same way that the financial industry creates a credit score. By assigning weight to information derived from the above list, the subject technology can provide an estimate of the threat that an individual poses. In example aspects, this threat level can be balanced with traditional information (e.g., detainee behavior when arrested and while in custody, body language, and human interpretation of criminal charges) in order to estimate a threat level.

Figure 2:
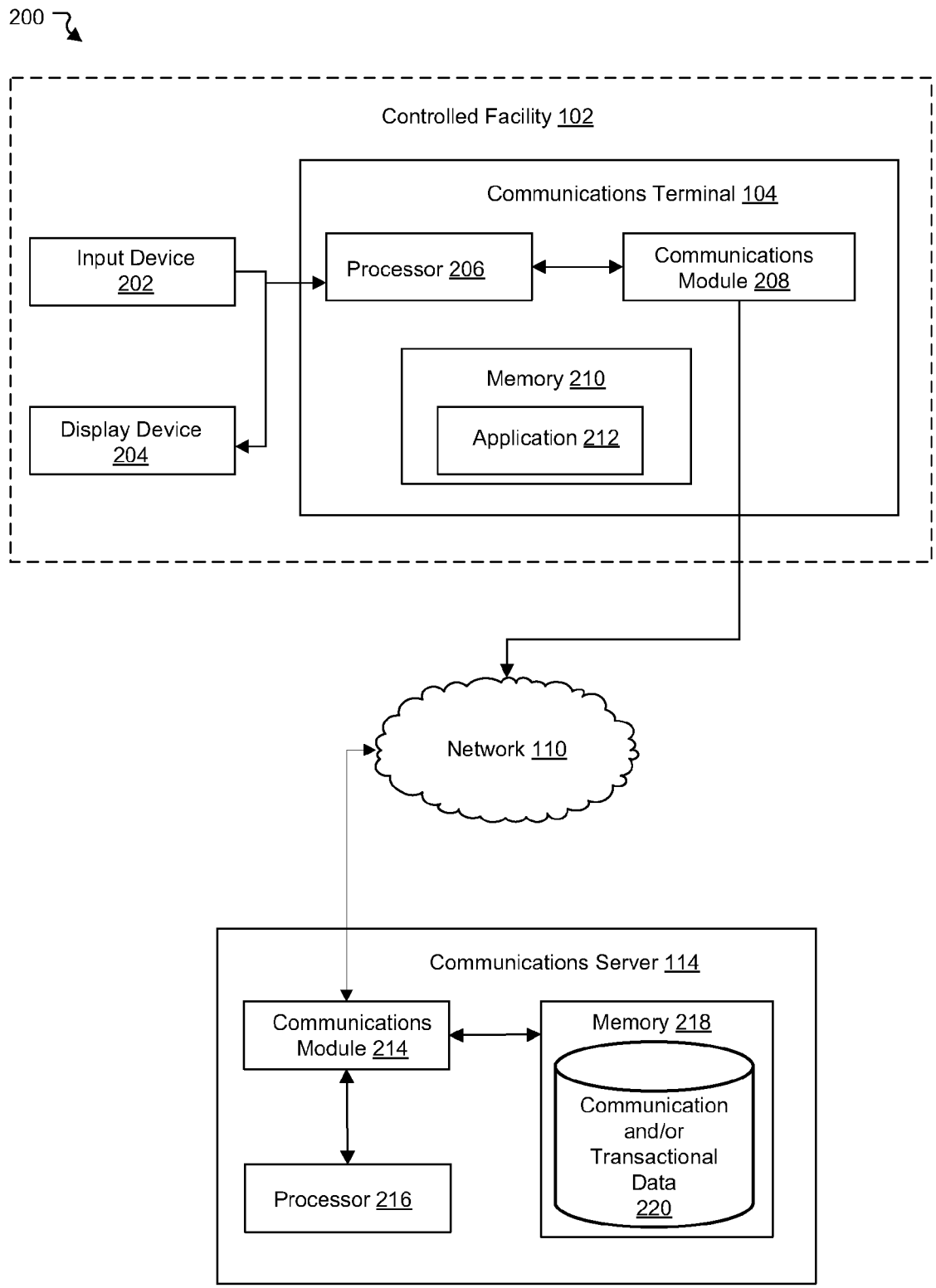
FIG. 2 is a block diagram illustrating the example communications terminal and communications server from the architecture of FIG. 1 according to certain aspects of the disclosure.

FIG. 2 is a block diagram 200 illustrating an example communications terminal 104 and communications server 114 in the architecture 100 of FIG. 1 according to certain aspects of the disclosure. The communications terminal 104 and communications server 114 are connected over the network 110 via respective communications modules 208 and 214. The communications modules 208 and 214 are configured to interface with the network 110 to send and receive information, such as data, requests, responses, and commands to other devices on the network 110. The communications modules 208 and 214 can be, for example, modems or Ethernet cards.

The communications terminal 104, which can be, but is not limited to, a telephone, videophone, camera, or deposit kiosk, includes a processor 206 (or connected downstream to a processor, e.g., at communications server 114), the communications module 208, and a memory 210 that includes an application 212. Although the communications terminal 104 is illustrated as including the processor 206 for example only, it is understood that in certain aspects where, for example, the communications terminal 104 is a telephone, the processor 206 is not included in the communications terminal. In example aspects, the application is configured to report communications and/or transactions for the communications terminal 104. As discussed below, such reporting can log the time/duration of the communication, and the identity of the participating individuals (e.g., the detainee and the other participating party). The communications terminal 104 also includes (or is coupled to) an input device 202 and an output device 204, such as a display. The input device 202 can include, for example, a keyboard, a touchpad, a microphone, a camera, touchscreen, or mouse.

The processor 206 of the communications terminal 104 is configured to execute instructions, such as instructions physically coded into the processor 206, instructions received from software (e.g., application 212) in memory 210, or a combination of both, to provide individual communication and/or transaction reports, for aggregation by communications server 114.

Communications server 114 receives the communication and/or transaction reports (e.g., using communications module 214), and can store received multiple communication and/or transaction reports on a per-detainee basis. In the example of FIG. 2, the aggregated data is stored in memory 218, and more particularly, in communication and/or transactional database 220.

Furthermore, communications server 114, using processor 216, can receive a request for a threat level of one or more individuals. The threat level can be requested automatically (e.g., periodic requests) or manually for an individual (e.g., detainee). In response to the received request, communications server 114 accesses the aggregated data (e.g., from communication and/or transactional database 220) comprising at least one of communication history data or transaction history data for the one or more individuals. Communications server 114 applies one or more predetermined metrics (e.g., algorithms) to the obtained aggregated data, to determine threat level information for the one or more individuals. Communications server 114 provides the determined threat level information for display.

Although the disclosed block diagram 200 illustrates the communication and/or transactional database 220 as being stored in the memory 218 of the communications server 114, the communication and/or transactional database 220 can be stored in the memory 210 of the communications terminal 104, or the communications server 114 can be located in the controlled facility 102. For example, the communication and/or transactional database 220 can be provided by the communications server 114 to one or many communications terminals 104, for example, as a form of data replication.

Thus, the subject technology can be implemented as a process that may be scheduled to run regularly on some or all individuals, or it may be triggered to run for an individual, or group of individuals. The process may be run for a specific time range (e.g., one week or one month period), for a individuals current period of detention, or for all available detention periods for a specific individual (for example, multiple jail stints that could be in multiple facilities).

As noted above, communications server may apply one or more predetermined metrics for user data obtained from communication and/or transactional database 220. For each individual over a given time period, the software may analyze one or more fields, including but not limited to, calls, voicemails, visits, other communications, deposits, detainee spend information, detainee system details or other information.

For calls, the following information may be aggregated within communication and/or transactional database 220 and analyzed via processor 216 using predetermined metrics: a total number of attempted calls; a total number of connected calls; an average length of connected calls; a total minutes of connected calls; a number of three-way calls (which may be prohibited in correctional facilities); a percent of calls found to be three-way calls; a number of flagged calls (e.g.; calls are manually flagged to indicate interest on the part of an investigator); a percent of calls that are flagged; a number of alarmed calls (e.g.; calls are automatically flagged as alarms when conditions set by an investigator occur; such as person A calling person B); a percent of alarmed calls; and a total number of unique persons communicated with over the phone.

With reference to voicemails, the following information may be aggregated within communication and/or transactional database 220 and analyzed via processor 216 using predetermined metrics: a total number of voicemails received; an average length of voicemails received; and total minutes for received voicemails.

For visits, the following information may be aggregated within communication and/or transactional database 220 and analyzed via processor 216 using predetermined metrics: a total number of onsite phone visits conducted; an average length of onsite phone visits conducted; total minutes of onsite phone visits conducted; a total number of onsite video visits conducted; an average length of onsite video visits conducted; total minutes of onsite video visits conducted; total onsite video visits canceled or no show; a total number of Internet video visits conducted; an average length of Internet video visits conducted; total minutes of Internet video visits conducted; total Internet video visits canceled or no show; and total number of unique persons visited with.

For other communications, the following information may be aggregated within communication and/or transactional database 220 and analyzed via processor 216 using predetermined metrics: a total number of photos sent; a total number of photos received; a total number of videos sent; a total number of videos received; a total number of text based messages sent; a total number of text based messages received; and a total number of unique persons communicated with via text, video or photos.

With reference to deposits, the following information may be aggregated within communication and/or transactional database 220 and analyzed via processor 216 using predetermined metrics: total number of kiosk deposits, an average amount of kiosk deposits; a total dollar amount of kiosk deposits; a percent of all deposits made with cash; a percent of overall cash deposits made with large denomination bills; a total number of cash deposits with large denomination bills; a total dollar amount of cash deposits with large denomination bills; an average size of cash deposits with large denomination bills; a total number of over-the-phone deposits; an average amount of over-the-phone deposits; a total dollar amount of over-the-phone deposits; a total number of unique persons depositing funds.

Regarding detainee spend information, the following information may be aggregated within communication and/or transactional database 220 and analyzed via processor 216 using predetermined metrics: total spent on communication; and total spent on entertainment. In addition, for detainee system details, the following information may be aggregated within communication and/or transactional database 220 and analyzed via processor 216 using predetermined metrics: a number of known arrests; a cumulative time spent detained; a number of correctional facilities that the individual is known to have been housed in; and an alleged or convicted crime (e.g., whether it is categorized as violent).

In example aspects, other information that may be aggregated within communication and/or transactional database 220 and analyzed via processor 216 using predetermined metrics include: an average number of individuals connected to persons called by the individual (e.g., if each person called by a individual has connected with numerous other individuals, then this number would be high and possibly suspicious); a number of persons in contact with the individuals who are also in contact with known violent individuals (e.g., do the friends have other friends known to be violent); a total number of known violent incidents in the individuals past.

In addition to the above fields of data and type of information that can be aggregated, it is also possible for communications server 114 to analyze the content of one or more individual communications using predetermined metrics. For example, text versions of communications (e.g., emails or other text-based messages, audio or image data converted to text) can be analyzed for keywords that indicate, or that do not indicate, a likelihood of threatening activity by one or more individuals.

With further reference to the predetermined metrics, in order to create a useable threat index, data can be aggregated from various sources, the data can be calculated into numbers that can be analyzed, weights can be applied to the numbers, and a summary of the results that includes a threat index can be generated. In example aspects, the algorithm that is used to determine the threat index may change over time as variables are compared to those of individuals that are known to be violent (e.g., based on actual behavior).

This algorithm may be determined manually, or aspects of it may be determined by automated statistical analysis to determine the strength of individual variables in contributing to violent behavior. For example, if a weak correlation is made between number of voicemails and violent behavior and a strong correlation is be made between a high number of large denomination cash deposits (e.g., $50 and $100 bills) and violence, then the algorithm will be adjusted to give more weight to the later variable in computing the threat index.

Also, because the statistical relevance of data may vary based on identifiable factors regarding the individual. The algorithm may vary between individuals based on factors such as, but not limited to: age; gender; geography; charged or convicted crime; and length of time detained. For example, communication patterns of 18-year-old females who have been in jail for less than two weeks may be different from those of 50-year-old males who have been in prison for over 20 years. As a result, algorithms have the potential to vary between individuals.

In example aspects, the subject technology requires access to communications data and a display mechanism, such as a Web browser or printer, to display the information. Display of the threat level information will be described in greater detail below with reference to FIG. 3.

It should be noted that a statistically significant amount of time or data may be required for the algorithm to perform well. For example, the algorithm may work for a individual who is in custody for a short period of time, but who generates enough data (e.g., call attempts, deposits, visits, etc.) to analyze. In another example, the algorithm may work for a person who is in custody for a reasonable period of time, perhaps over a week, and makes little or no attempt to communicate and receives few or no deposits (e.g., lack of contact over time can be statistically relevant). However, in example aspects, for someone who is in custody for a few days or less and makes little or no attempt to communicate and receives few or no deposits, the algorithm may not be as effective.

Thus, the subject technology analyzes available data, populates variables with aggregate data, assigns weight to variables (e.g., with extra significance to variables that are more statistically relevant to determining likelihood of threatening behavior), and calculates a score or other visual representation.

Today, estimates of a detainee's likelihood to commit violent behavior are based on human interpretation of past violent incidences, criminal charges or convictions, and less tangible elements like a detainee's attitude towards correctional officers. This base information is a very narrow slice of available data.

The subject technology supplements already available information with detailed analysis of data that is either unavailable or difficult to acquire or understand. The subject technology is also able to give weight to statistically significant variables that may not make intuitive sense to a person. When humans make decisions, they can give far more weight to factors that they fully comprehend. For example, a muscular detainee with gang tattoos is more likely to attract the attention of detention staff than a skinny detainee who is constantly trying to make phone calls but rarely succeeding in connecting with someone. With the subject technology, if it is determined statistically that detainees that make three to five unsuccessful phone call attempts for every phone call that is answered by a human are more likely to be a threat to others, that can be factored into the threat index without anyone first needing to know why.

One major advantage is that the subject technology is capable of providing law enforcement officials with a list of detainees that have a higher probability of causing problems in the future. Even if detainees identified by a high threat index are only 10% more likely than a randomly selected group of detainees to engage in threatening behavior, the identification of those detainees is still useful to law enforcement officials.

A facility that spreads limited resources (such as the attention of guards) evenly is more likely to have problems than a facility that is able to apply more attention to individuals who have a higher likelihood of posing a threat. A comparison may be drawn to police departments that use crime statistics and census statistics to determine areas that warrant higher numbers of officer patrols.

Figure 3:
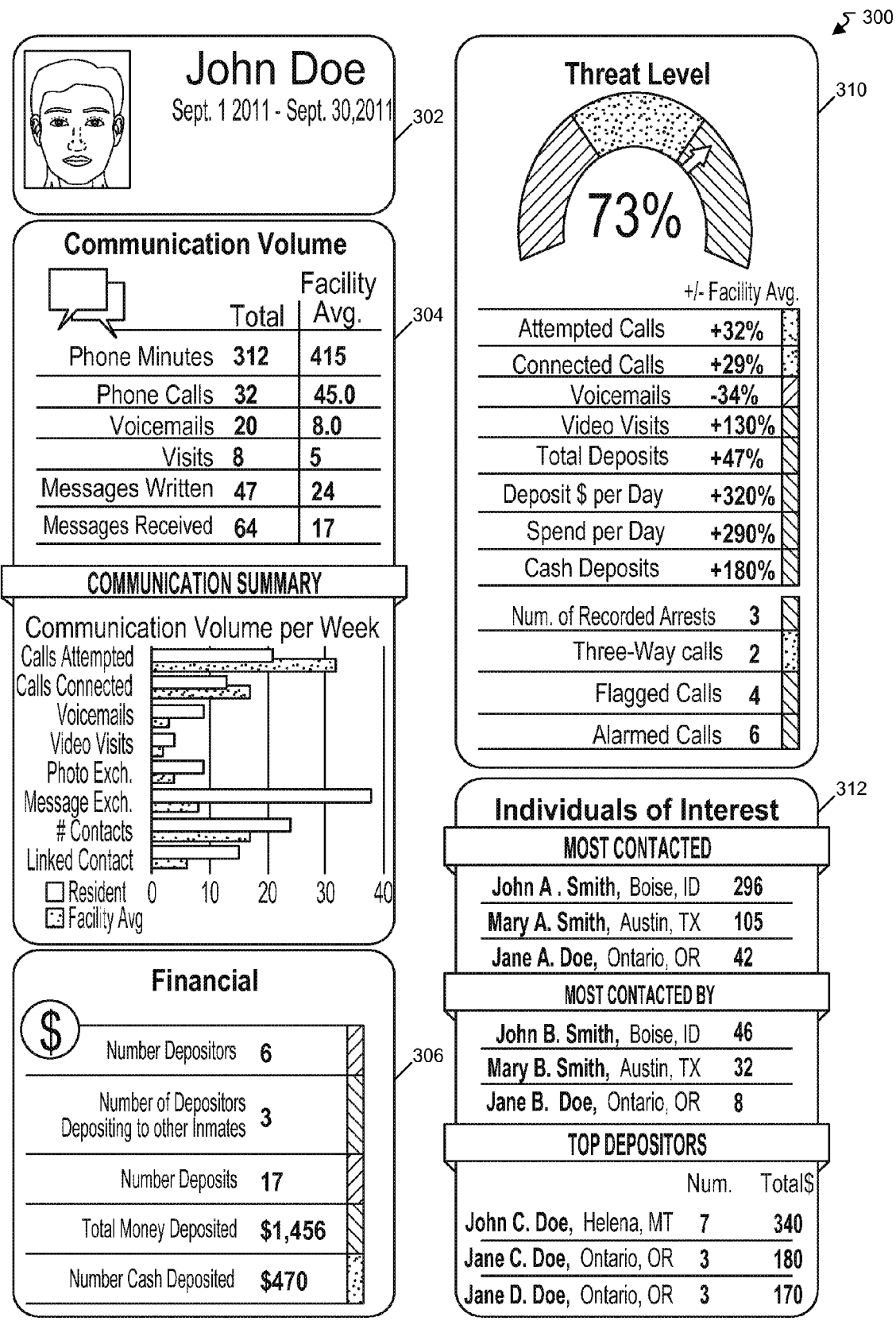
FIG. 3 illustrates an example of a user interface displaying threat level information for an individual.

FIG. 3 illustrates an example of a user interface displaying threat level information for an individual. In the example of FIG. 3, user interface 300 includes a name portion 302, a communication history portion 304, a transaction history portion 306, a threat level analysis portion 310 and a individuals of interest portion 312.

User interface 300 corresponds to a visual representation of threat level analysis, and is created and displayed for the requesting party. The display of the user interface 300 can be in the form of an email, an onscreen display, a printed page, or a file (e.g., PDF) that is available for download.

As shown with reference to threat level analysis portion 310, the threat index is displayed in the form of a visual image indicating a level of threat. In the example of FIG. 3, threat level analysis portion 310 displays the threat level in the form of a dial. In alternative aspects, the visual image may be in the form of a thermometer, traffic light, or color (e.g., on a scale). Alternatively, or in addition, the threat index score may be represented by a number, a percentage (e.g., a percentage of likelihood that the individual will act violently), or a category, such as "Likely Violent," or "Possibly Violent" or "Unlikely Violent."

In the example of FIG. 3, user interface 300 displays the threat index data for a single detainee. However, in alternative example aspects, user interface 300 can display the threat index data for numerous detainees at once (e.g., in a logical order, such as listing the highest threat first in the list).

User interface 300 can display communication volume (e.g., phone minutes, phone calls, etc.) and a communication summary (e.g., calls attempted, calls connected) within communication history portion 304. In addition, financial history portion 306 can display a history of transactions for an individual, for example, a number of depositors, a number of depositors depositing to other detainees, a number of deposits, etc.

User interface 300 may show additional information in an individuals of interest portion 312. Individuals of interest portion 312 may display which individuals were contacted by the detainee the most, which individuals attempted to contact the detainee the most, and which individuals deposited the most funds, and made the most frequent deposits for the detainee.

By virtue of the foregoing, a facility staff member can use the information provided by user interface 300 to identify potentially threatening individuals in their correctional facility who might not otherwise have come to their attention. An individual who has not exhibited violent or unusual behavioral patterns and who was arrested for a non-violent crime, for example, probably would not come to the attention of corrections staff.

However, using the subject technology, corrections staff could run a threat index report, or receive a threat index alert, or view individuals with a high threat index value from within an administration system for a correctional facility. If a individual is found with a high threat index, but without exhibiting other threatening behavior, corrections staff could interview the individual, move the individual, or simply give the individual more attention. Thus, law enforcement officials can be given information that they may not normally have to defend against, prevent, or otherwise address before a threatening incident takes place.

In example aspects, the threat index by itself may not lead to direct action, such as separating a individual from others. The subject technology can alert officials to an individual or group of individuals based on patterns or trends that correlate with actual threatening behavior of individuals who exhibited similar communication patterns.

Likewise, the subject technology can be used to provide facility staff with additional information to indicate that a detainee is less likely to be a threat. A individual who calls his/her family regularly and who receives regular deposits of money from a small number of people may be considered a lower threat than a individual who does not connect regularly with outsiders or who receives money from a large number of people.

Figure 4:
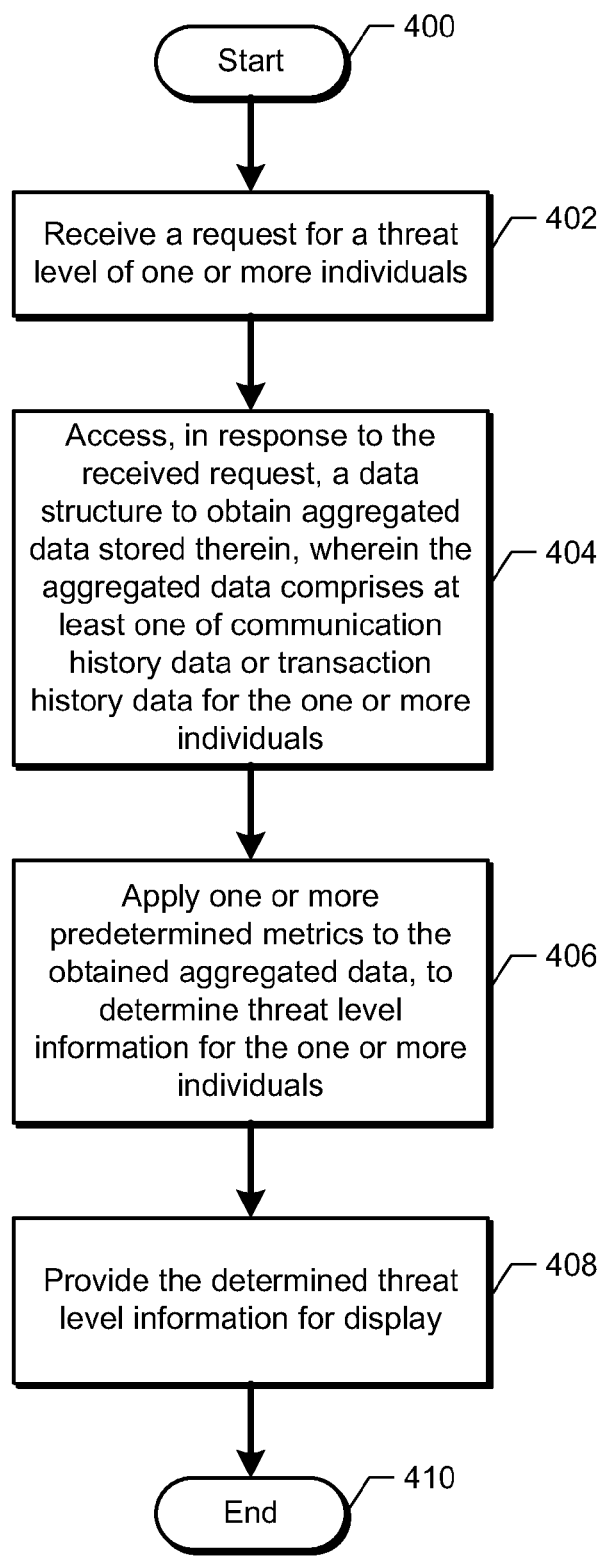
FIG. 4 illustrates an example process in which a threat level for one or more individuals is determined.

FIG. 4 illustrates an example process in which a threat level for one or more individuals is determined. Following start block 400, a request for a threat level of one or more individuals is received at step 402. The threat level can indicate, for each of the one or more individuals, a level of likelihood that the individual will exhibit violent or recidivistic behavior (e.g., to others or to themselves). The request can be an automatically-generated request, such as an automatic request for a threat level of all detainees scheduled for transport on a given day. Alternatively, or in addition, the request can be manually-generated by a user requester. The one or more individuals can be detainees within a correctional facility.

At step 404, in response to the received request, a data structure is accessed to obtain aggregated data stored therein. The aggregated data includes at least one of communication history data or transaction history data for the one or more individuals.

Each of the communication history data and the transaction history data can include statistical data. The statistical data for the communication history data can correspond to at least one of telephone calls, voicemails, onsite phone visits, onsite video visits, photo messages, video messages, text messages. The statistical data for the transaction history data can correspond to deposits, or spending for communication or entertainment.

At step 406, one or more predetermined metrics are applied to the obtained aggregated data, to determine threat level information for the one or more individuals. The one or more predetermined metrics can apply respective weights to the statistical data for the communication history data or the transaction history data, to determine the threat level information for the one or more individuals.

At step 408, the determined threat level information is provided for display. In example aspects, subsequent to determining the threat level information, indication of actual threat data performed by one of the one or more individuals can be received. In response to the received indication, the one or more predetermined metrics can be updated based on the aggregated data for the one individual, for future determination of threat level information.

In example aspects, it is not necessary to receive a request at step 402, and the process can proceed directly to step 404 from start block 400. By skipping step 402, it is possible for the process to calculate threat levels for multiple inmates (e.g., all inmates), for example, to report the inmates with the highest threat levels.

In a case where the one or more individuals are detainees, the threat level can further be determined based on a number of known arrests or a cumulative time spent detained for the individual. The process then ends at end block 410.

Figure 5:
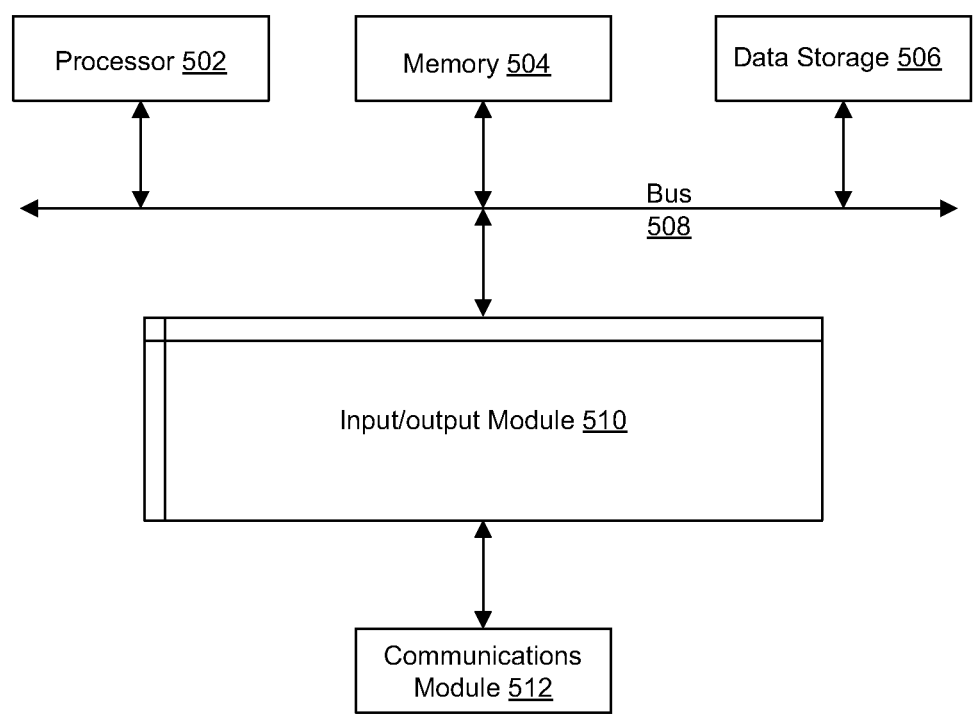
FIG. 5 is a block diagram illustrating an example computer system with which the example communications terminal and communications server of FIG. 2 can be implemented.

FIG. 5 is a block diagram illustrating an example computer system with which the example communications terminal and communications server of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., communications terminal 104 and communications server 114) includes a bus 508 or other communication mechanism for communicating information, and a processor 502 (e.g., processor 206, 222, and 242) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 210, 226, and 246), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications modules 208 and 214) include networking interface cards, such as Ethernet cards and modems. In certain aspects, the input/output module 510 is configured to connect to a plurality of devices, such as an input device (e.g., input device 202) and/or an output device 516 (e.g., display device 204). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices include display devices, such as a LED (light emitting diode), CRT (cathode ray tube), or LCD (liquid crystal display) screen, for displaying information to the user.

According to one aspect of the present disclosure, the communications terminal 104 and communications server 114 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 110) can include, for example, any one or more of a PAN, LAN, CAN, MAN, WAN, BBN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description, including the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for determining a threat level for one or more individuals, the method comprising:
   accessing a data structure to obtain aggregated data stored therein, wherein the aggregated data comprises at least one of communication history data or transaction history data for one or more individuals;
   applying one or more predetermined metrics to the obtained aggregated data, to determine threat level information for the one or more individuals, wherein at least one of the one or more predetermined metrics is weighted so that the threat level information is indicative, for each of the one or more individuals, of a level of likelihood that the individual will exhibit violent or recidivistic behavior; and
   providing the determined threat level information for display.

2. The method of claim 1, wherein each of the communication history data and the transaction history data comprise statistical data.

3. The method of claim 2, wherein the statistical data for the communication history data corresponds to at least one of telephone calls, voicemails, onsite phone visits, onsite video visits, photo messages, video messages, text messages.

4. The method of claim 2, wherein the statistical data for the transaction history data corresponds to deposits, or spending for communication or entertainment.

5. The method of claim 2, wherein the one or more predetermined metrics apply respective weights to the statistical data for the communication history data or the transaction history data, to determine the threat level information for the one or more individuals.

6. The method of claim 1, further comprising:
   receiving, subsequent to determining the threat level information, indication of actual threat data performed by one of the one or more individuals; and updating, in response to the received indication, the one or more predetermined metrics based on the aggregated data for the one individual, for future determination of threat level information.

7. The method of claim 1, wherein the accessing is performed in response to a received request for the threat level of the one or more individuals.

8. The method of claim 7, wherein the request is one of an automatically generated request or a request manually generated by a user.

9. The method of claim 1, wherein the one or more individuals are detainees within a correctional facility.

10. The method of claim 9, wherein for each of the one or more individuals, the threat level is further determined based on a number of known arrests or a cumulative time spent detained for the individual.

11. A system for determining a threat level for one or more individuals, the system comprising:
one or more processors; and
a machine-readable medium comprising instructions stored therein, which when executed by the processors, cause the processors to perform operations comprising:
accessing a data structure to obtain aggregated data stored therein, wherein the aggregated data comprises at least one of communication history data or transaction history data for one or more individuals;
applying one or more predetermined metrics to the obtained aggregated data, to determine threat level information for the one or more individuals, wherein at least one of the one or more predetermined metrics is weighted so that the threat level information is indicative, for each of the one or more individuals, of a level of likelihood that the individual will exhibit violent or recidivistic behavior; and
providing the determined threat level information for display.

12. The system of claim 11, wherein each of the communication history data and the transaction history data comprise statistical data.

13. The system of claim 12, wherein the statistical data for the communication history data corresponds to at least one of telephone calls, voicemails, onsite phone visits, onsite video visits, photo messages, video messages, text messages.

14. The system of claim 12, wherein the statistical data for the transaction history data corresponds to deposits, or spending for communication or entertainment.

15. The system of claim 12, wherein the one or more predetermined metrics apply respective weights to the statistical data for the communication history data or the transaction history data, to determine the threat level information for the one or more individuals.

16. The system of claim 11, the operations further comprising:
receiving indication of at least one threatening action performed by one of the one or more individuals; and
updating, in response to the received indication, the one or more predetermined metrics based on the aggregated data for the one individual, for subsequent determination of threat levels.

17. The system of claim 11, wherein the accessing is performed in response to a received request for the threat level of the one or more individuals.

18. A non-transitory, machine-readable medium comprising instructions stored therein, which when executed by a system, cause the system to perform operations comprising:
accessing a data structure to obtain aggregated data stored therein, wherein the aggregated data comprises at least one of communication history data or transaction history data for one or more individuals;
applying one or more predetermined metrics to the obtained aggregated data, to determine threat level information for the one or more individuals, wherein at least one of the one or more predetermined metrics is weighted so that the threat level information is indicative, for each of the one or more individuals, of a level of likelihood that the individual will exhibit violent or recidivistic behavior; and
providing the determined threat level information for display.

19. The non-transitory, machine-readable medium of claim 18, wherein each of the communication history data and the transaction history data comprise statistical data.

20. The non-transitory, machine-readable medium of claim 19, wherein the statistical data for the communication history data corresponds to at least one of telephone calls, voicemails, onsite phone visits, onsite video visits, photo messages, video messages, text messages.

* * * * *